United States Patent
Challenger et al.

(10) Patent No.: US 6,725,265 B1
(45) Date of Patent: Apr. 20, 2004

(54) METHOD AND SYSTEM FOR CACHING CUSTOMIZED INFORMATION

(75) Inventors: James R. H. Challenger, Garrison, NY (US); Paul M. Dantzig, Scarsdale, NY (US); Daniel M. Dias, Mohegan Lake, NY (US); Arun K. Iyengar, Yorktown Heights, NY (US); Junehwa Song, Taejeon (KR)

(73) Assignee: International Business Machines Corporation, Armonk, NY (US)

( * ) Notice: Subject to any disclaimer, the term of this patent is extended or adjusted under 35 U.S.C. 154(b) by 568 days.

(21) Appl. No.: 09/626,327

(22) Filed: Jul. 26, 2000

(51) Int. Cl.[7] ............................................. G06F 15/173
(52) U.S. Cl. ........................................ 709/226; 709/203
(58) Field of Search ................................ 709/226, 203, 709/213, 214, 215, 7

(56) References Cited

U.S. PATENT DOCUMENTS 5,894,554 A * 4/1999 Lowery et al. ............. 709/203
6,021,426 A * 2/2000 Douglis et al. ............. 709/200
6,112,242 A * 8/2000 Jois et al. ................... 709/225
6,262,729 B1 * 7/2001 Marcos et al. .............. 345/744

* cited by examiner

Primary Examiner—Mehmet B. Geckil
(74) Attorney, Agent, or Firm—F. Chau & Associates, LLC

(57) ABSTRACT

A method for providing customized information in a computer processing system includes the step of defining at least one rule for one of creating and retrieving at least one customized block of data. At least one customizable template is created which includes at least one reference to the at least one rule and at least one offset that specifies at least one position at which the at least one customized block is inserted into the at least one customizable template. The at least one customized block is inserted into the at least one customizable template at the at least one position specified by the at least one offset. The customized block, the customizable template, and/or the rule may be pre-stored in a cache of the computer processing system. The customized block may also be dynamically created.

39 Claims, 6 Drawing Sheets

<!--(offset 1, rule id1), (offset 2, rule id2)--!>

FIG. 2 static RIB — 302
.edu    file1.txt
        file2.txt
        file3.txt
.com    file4.txt
        file5.txt
        file6.txt
others  file7.txt dynamic RIB — 350
function id

FIG. 3

METHOD AND SYSTEM FOR CACHING CUSTOMIZED INFORMATION

BACKGROUND

1. Technical Field

The present invention relates generally to caches in computer processing systems and, in particular, to a method and system for caching customized information in a network-server system.

2. Background Description

Caching is commonly used to improve the performance of a computer system. By caching an object, the cost for fetching or creating the object is only incurred once. Subsequent requests for a cached object can be satisfied from the cache, a process which incurs significantly less overhead than recalculating the object or fetching the object from a remote location.

One of the key requirements for state-of-the-art Web sites is to provide pages which are customized and do not appear the same each time they are accessed. Consider the following two examples. In the first example, a commercial Web site often provides advertisements on its Web pages. The advertisements may need to change each time the page is accessed. In the second example, a Web site may need to provide customized information. For instance, a Web page may provide personalized information which is specific to the client requesting the Web page. The personal information may depend on the Internet Protocol (IP) address of the client (e.g. special Web pages at an IBM site for all clients from ibm.com, different Web pages depending upon the client's country) or on cookies or other state information provided by the client.

Customized Web pages are becoming increasingly important as Web sites become more sophisticated. Accordingly, it would be desirable and highly advantageous to have a method for [. . . ].

SUMMARY OF THE INVENTION

The problems stated above, as well as other related problems of the prior art, are solved by the present invention, a method for caching customized information in a client server system.

According to a first aspect of the invention, there is provided a method for providing customized information in a computer processing system. The method includes the step of defining at least one rule for one of creating and retrieving at least one customized block of data. At least one customizable template is created which includes at least one reference to the at least one rule and at least one offset that specifies at least one position at which the at least one customized block is inserted into the at least one customizable template. The at least one customized block is inserted into the at least one customizable template at the at least one position specified by the at least one offset.

According to a second aspect of the invention, the method further includes the step of examining the at least one customizable template to identify at least one of the at least one offset and the at least one reference.

According to a third aspect of the invention, the computer processing system includes at least one client, at least one server, and at least one cache.

According to a fourth aspect of the invention, the method further includes the steps of receiving at least one request for information from the at least one client by the at least one cache, and determining whether the at least one request references the at least one customizable template.

According to a fifth aspect of the invention, the method further includes the step of pre-storing the at least one customized block at a location within the at least one cache prior to said receiving step, and wherein said defining step includes the step of specifying the location of the at least one customized block within the at least one rule.

According to a sixth aspect of the invention, the method further includes the step of pre-storing the at least one customized block at a location external to the at least one cache prior to said receiving step, and wherein said defining step includes the step of specifying the location of the at least one customized block within the at least one rule.

According to a seventh aspect of the invention, the external location is within a memory device of one of the at least one server and a server other than the at least one server.

According to an eighth aspect of the invention, the method further includes the step of retrieving the at least one customized block from a location specified by the at least one rule.

According to a ninth aspect of the invention, the method further includes the step of dynamically creating the at least one customized block, when the at least one request references the at least one customizable template.

According to a tenth aspect of the invention, the method further includes the step of dynamically creating the at least one customized block by invoking a function corresponding to an executable computer program, and wherein said defining step includes the step of specifying the function within the at least one rule.

According to an eleventh aspect of the invention, the at least one customized block is one of created and retrieved based upon the identity of the at least one client.

According to a twelfth aspect of the invention, the method further includes the step of determining whether to add data to the at least one cache for creating the at least one customized block, based upon an estimated overhead for creating the at least one customized block.

According to a thirteenth aspect of the invention, the method further includes the step of determining whether to delete data from the at least one cache for creating the at least one customized block, based upon an estimated overhead for creating the at least one customized block.

According to a fourteenth aspect of the invention, the at least one request includes at least two requests, and the method further includes the step of partitioning the at least two requests into at least two partitions based upon predefined criteria.

According to a fifteenth aspect of the invention, the predefined criteria is an identity of an individual initiating the request.

According to a sixteenth aspect of the invention, the at least one rule identifies a list of data for creating the at least one customized block, and the method includes the steps of determining whether the list comprises more than one item. A selection method is associated with at least one of the at least two partitions that selects at least one appropriate item from the list, when the list comprises more than one item.

According to a seventeenth aspect of the invention, the method further includes the step of populating the at least one cache with at least one of the at least one customized block and the at least one rule, at least one of on demand and automatically though an interface operatively coupled to a server program.

According to an eighteenth aspect of the invention, the method further includes the step of at least one of dynamically updating and changing the at least one rule through the interface.

According to a nineteenth aspect of the invention, there is provided a system for providing customized information in a client-server environment. The system includes at least one client and at least one server. A network is adapted to couple the at least one client to the at least one server. At least one cache is adapted to create the customized information by inserting at least one customized block into at least one customizable template when at least one request for information references the at least one customizable template. An interface is adapted to couple the at least one server to the at least one cache.

These and other aspects, features and advantages of the present invention will become apparent from the following detailed description of preferred embodiments, which is to be read in connection with the accompanying drawings.

BRIEF DESCRIPTION OF THE DRAWINGS

FIG. 2 is a diagram illustrating a method for specifying customizable blocks within a HyperText Markup Language (HTML) page, according to an illustrative embodiment of the invention;

FIG. 3 is a diagram illustrating a static rule information block (RIB) and a dynamic RIB, according to an illustrative embodiment of the invention;

DETAILED DESCRIPTION OF PREFERRED EMBODIMENTS

Figure 1:
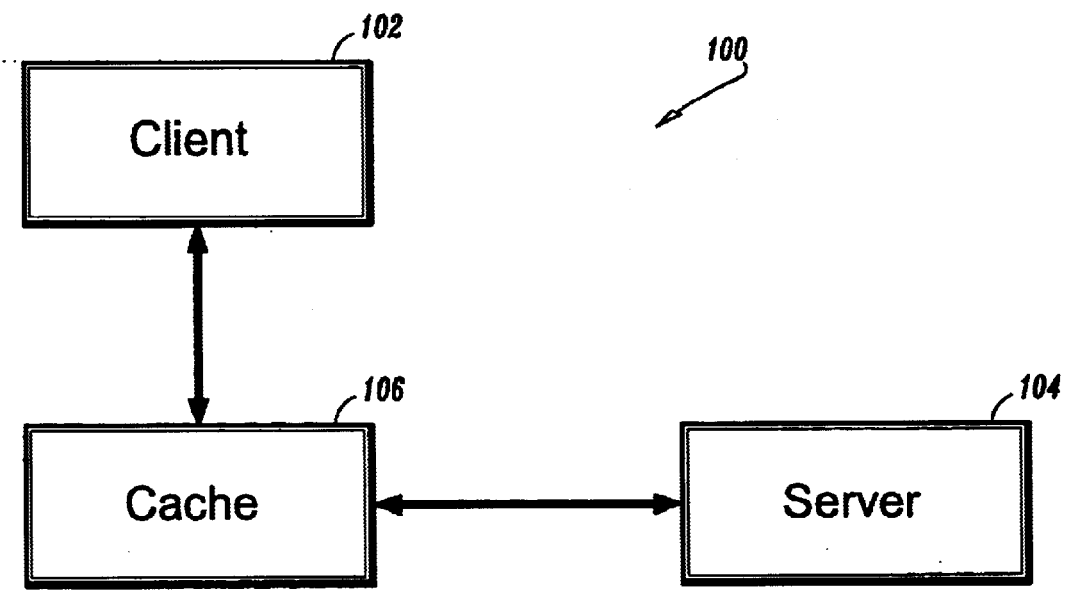
FIG. 1 is a diagram illustrating a client-server system to which the invention can be applied, according to an illustrative embodiment thereof.

The present invention is directed to a method for caching customized information in a client server system. It is to be understood that the present invention may be implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and micro instruction code. The various processes and functions described herein may either be part of the micro instruction code or part of the application program (or a combination thereof) which is executed via the operating system. In addition, various other peripheral devices may be connected to the computer platform such as an additional data storage device and a printing device.

It is to be further understood that, because some of the constituent system components and method steps depicted in the accompanying Figures may be implemented in software, the actual connections between the system components (or the process steps) may differ depending upon the manner in which the present invention is programmed. Given the teachings of the present invention provided herein, one of ordinary skill in the related art will be able to contemplate these and similar implementations or configurations of the present invention.

A general description of the present invention will now be provided to introduce the reader to the concepts of the invention. Subsequently, more detailed descriptions of various aspects of the invention will be provided with respect to FIGS. 1 through 5.

According to an illustrative embodiment of the invention, customization of information is achieved by having a cache insert one or more blocks of data known as customized blocks (CB's) into a customizable Web page before the customizable Web page is served from the cache. Rules for creating the CB's are contained in rule information blocks (Ribs) stored in the cache.

A customizable page is typically stored in the cache without containing customized information. Instead, the page contains header information which includes the following for a CB which is to be inserted into the page: (1) the offset at which the CB is to be inserted into the page; and (2) a pointer to the RIB corresponding to the rule for generating the CB. Such a customizable page is referred to herein as a customizable template (CT).

According to an illustrative embodiment of the invention, there are two types of rules, static rules and dynamic rules. However, it is to be appreciated that the invention is not dependent on the particular types of rules disclosed herein and, thus, other types of rules may be employed while maintaining the spirit and scope of the invention.

For static rules, the customized information is contained either in the cache (which is preferable for performance reasons) or in a file which the cache can access, or the customized information may be obtained from a server accessible from the cache. It is to be noted that some caches may not have access to file systems or servers.

For dynamic rules, the customized information is created dynamically by executing a program. It is to be noted that some caches may not have the ability to handle dynamic rules.

According to an illustrative embodiment of the invention, an RIB for a static rule can partition requests according to predefined criteria. In a preferred illustrative embodiment, the predefined criteria is the Internet Protocol (IP) address of a client. For example, all requests from the United States of America could be classified into one partition, all requests from Canada could be classified into another partition, and so forth. In some cases, client IP addresses will not be examined and all requests will be classified into the same partition. For each partition, the RIB typically stores a list of cached objects and/or files which can be used to supply the customized information. If the list contains more than one element, a method is associated with the partition for choosing the appropriate cached object or file. Methods include, but are not limited to, round-robin and random selection. It is to be appreciated that the above predefined criteria for partitioning requests as well as the above methods for choosing the appropriate cached object or file are provided herein for illustrative purposes and, thus, other criteria and methods may be used. Given the teachings of the invention provided herein, one of ordinary skill in the related art will contemplate these and other types of predefined criteria, as well as these and other methods for choosing the appropriate cached object or file, while maintaining the spirit and scope of the invention.

An RIB for a dynamic rule may contain a pointer to a function that is invoked to generate the customized information.

When a request for a customized page p is received by a cache, the cache examines the header for the page p to determine which CB's need to be inserted. The cache makes a customized copy of the page p by inserting CB's at the appropriate offsets contained in the header and then returns the customized copy to the client. To calculate each CB, the cache examines the appropriate RIB. If the rule is static, then the cache may select the appropriate partition corresponding to the IP address of the client. The cache then selects a cached object or file corresponding to the partition for the customized information.

If the rule is dynamic, then the cache consults the RIB to determine which function to invoke. The cache then invokes the function. In doing so, the cache may pass additional information to the function (e.g., the IP address of the client, the requested Uniform Resource Locator (URL), cookie information, and so forth). The function then returns the customized information.

The cache can be populated with customizable data on demand or via an interface/API which a server program can use to push customizable pages and RIBs into the cache. This API can allow the RIBs to be changed dynamically.

FIG. 1 is a diagram illustrating a client-server system 100 to which the invention can be applied, according to an illustrative embodiment thereof. The system 100 includes at least one client 102 (hereinafter "client 102"), at least one server 104 (hereinafter "server 104"), and at least one cache 106 (hereinafter "cache 106").

The client 102 obtains information from the server 104. In accessing the client 102, the server 104 may incur significant latency and/or other overhead (e.g. network overhead). To reduce the overhead for such accesses, information from the server 104 may be stored in the cache 106. The client 102 would then be able to obtain cached information from the server 104 with considerably less overhead. One of the main features of the invention is the ability of the cache 106 to customize information sent to the client 102.

Conventional caches store the actual objects to be returned to clients. According to the present invention, the cache 106 stores customizable templates (CTs), which are objects whose content has only been partially specified. For example, FIG. 2 is a diagram illustrating a method for specifying customizable blocks within an HyperText Markup Language (HTML) page, according to an illustrative embodiment of the invention. In particular, FIG. 2 illustrates a comment line which could be inserted within an HTML page (e.g. Near the top). The cache would interpret this comment line to determine how to customize the object before returning the object to a client. The string (offset x, rule id x) indicates an offset within the HTML page where the xth customizable block should be inserted. Rule id x is a pointer to the RIB indicating how the xth customizable block should be created. It is to be appreciated that the method shown in FIG. 2 is but one example of many and, given the teachings of the invention provided herein, one of ordinary skill in the related would contemplate this and various other methods for specifying customizable blocks while maintaining the spirit and scope of the present invention. For example, another method may be specified based upon insertion into a document/page written in a different markup language or even a non-markup language.

FIG. 3 is a diagram illustrating a static rule information block (RIB) 302 and a dynamic RIB 350, according to an illustrative embodiment of the invention. The static RIB 302 is a rule which specifies different behavior depending upon, for example, the origin of the client. For example, if the client IP address resolves to a .edu entity, then the customized block is either file1.txt, file2.txt, or file3.txt. The exact customized block may be determined by any number of selection mechanisms, including but not limited to round robin and random selection. If the client IP address resolves to a .com entity, then the customized block is either file4.txt, file5.txt, or file6.txt. If the client IP address resolves to another type of entity (e.g. .org), then the customized block is file7.txt.

The dynamic RIB 350 contains a reference to a function to be invoked to create the customized block.

Figure 4A:
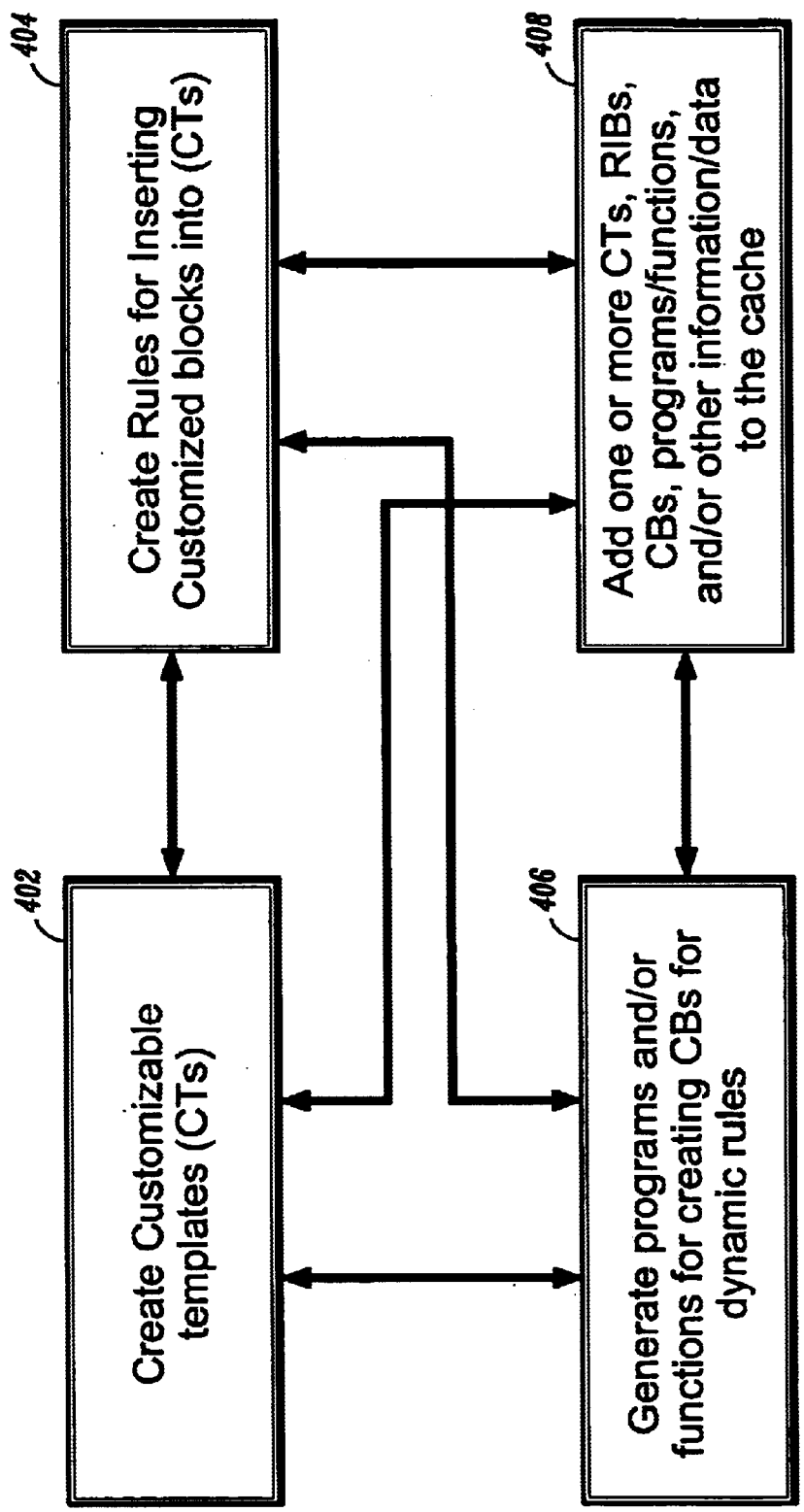
FIG. 4A is a flow diagram illustrating a method for creating and caching data, according to an illustrative embodiment of the invention.

FIG. 4A is a flow diagram illustrating a method for creating and caching data, according to an illustrative embodiment of the invention. Such data would typically created by the server 104 and stored by the cache 106.

Customizable templates are created (step 402). This could be done, for example, by a Web programmer. To create a customizable HTML template, a comment line similar to the comment line shown in FIG. 2 could be added to the beginning of an HTML page.

Rules are then created, for inserting customized blocks (CBs) into customizable templates (CTs) (step 404). The rules may be similar to those shown in FIG. 3. Of course, other types of rules may be used, or a combination thereof. Optionally, at step 404, one or more CB's corresponding to one or more static rules may be fetched. At Step 406, programs and functions are generated for creating CBs for dynamic rules.

One or more CTs, RIBs, CBs, programs/functions, and/or other information/data are added to the cache 106 (step 408). It is to be appreciated that such information may be added to the cache 106 after a cache miss for customized information. In addition, such information may be prefetched into the cache 106 by the server 104 communicating with the cache 106. Since cache space may be limited, it may be undesirable to cache customized information which takes up too much space. Therefore, the cache 106 may decide not to store customized information which takes up too much space. When the cache 106 becomes full, the cache 106 may choose to evict customized information which takes up significant space to make room for new data.

Additionally, it is undesirable for the cache 106 to consume a large number of CPU cycles for creating customized data. However, some dynamic rules may invoke functions which consume significant CPU cycles. A function invoked by a dynamic rule may optionally have an estimate of the overhead for invoking the function associated with the function. Thus, if the total overhead estimate for creating customized information is too high, then the cache 106 may decide not to store the customized information. When the cache 106 becomes full, the cache 106 may choose to evict customized information for which the total overhead for creating is too high.

According to a preferred embodiment of the invention, step 402 through step 414 are interleaved and performed in parallel. Of course, other sequencing is possible including variations of sequential and parallel processing.

Figure 4B:
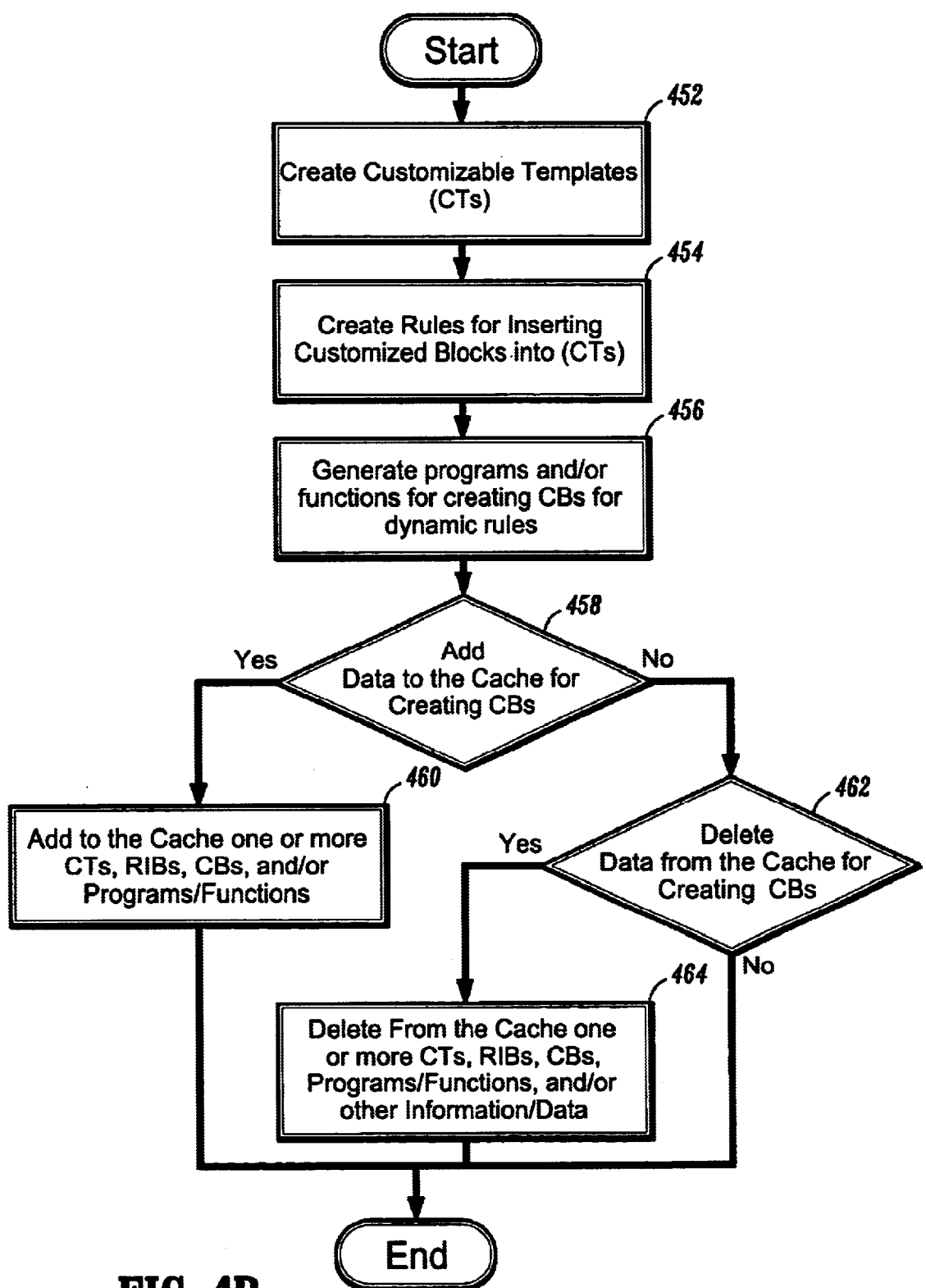
FIG. 4B is a flow diagram illustrating a method for creating and caching data, according to another illustrative embodiment of the invention.

FIG. 4B is a flow diagram illustrating a method for creating and caching data, according to another illustrative embodiment of the invention. Such data would typically created by the server 104 and stored by the cache 106.

Customizable templates are created (step 452). Rules are then created, for inserting customized blocks (CBs) into customizable templates (CTs) (step 454). Optionally, at step 454, one or more CB's corresponding to one or more static rules may be fetched. At Step 456, programs and functions are generated for creating CBs for any dynamic rules.

It is then determined whether to add data to the cache 106 for creating the CBs (step 458). If the result of the determination performed at step 458 is yes, then data (e.g., one or more CTs, RIBS, CBs, programs/functions, and/or other information/data) is added to the cache 106 (step 460), and the method is terminated. However, if the result of the determination performed at step 458 is no, then it is determined whether to delete data from the cache 106 for creating CBs and/or other information/data (step 462). If the result of the determination performed at step 462 is yes, then data (e.g., one or more CTs, RIBs, programs/functions, CBs, and/or other information/data) is deleted from the cache 106 (step 464), and the method is terminated. Otherwise, the method is immediately terminated. It is to be appreciated that the determinations performed at steps 458 and 462 may be based upon, for example, an estimated overhead for creating the at least one customized block.

According to a preferred embodiment of the invention, step 452 through step 464 are interleaved and performed in parallel. Of course, other sequencing is possible including variations of sequential and parallel processing.

Figure 5:
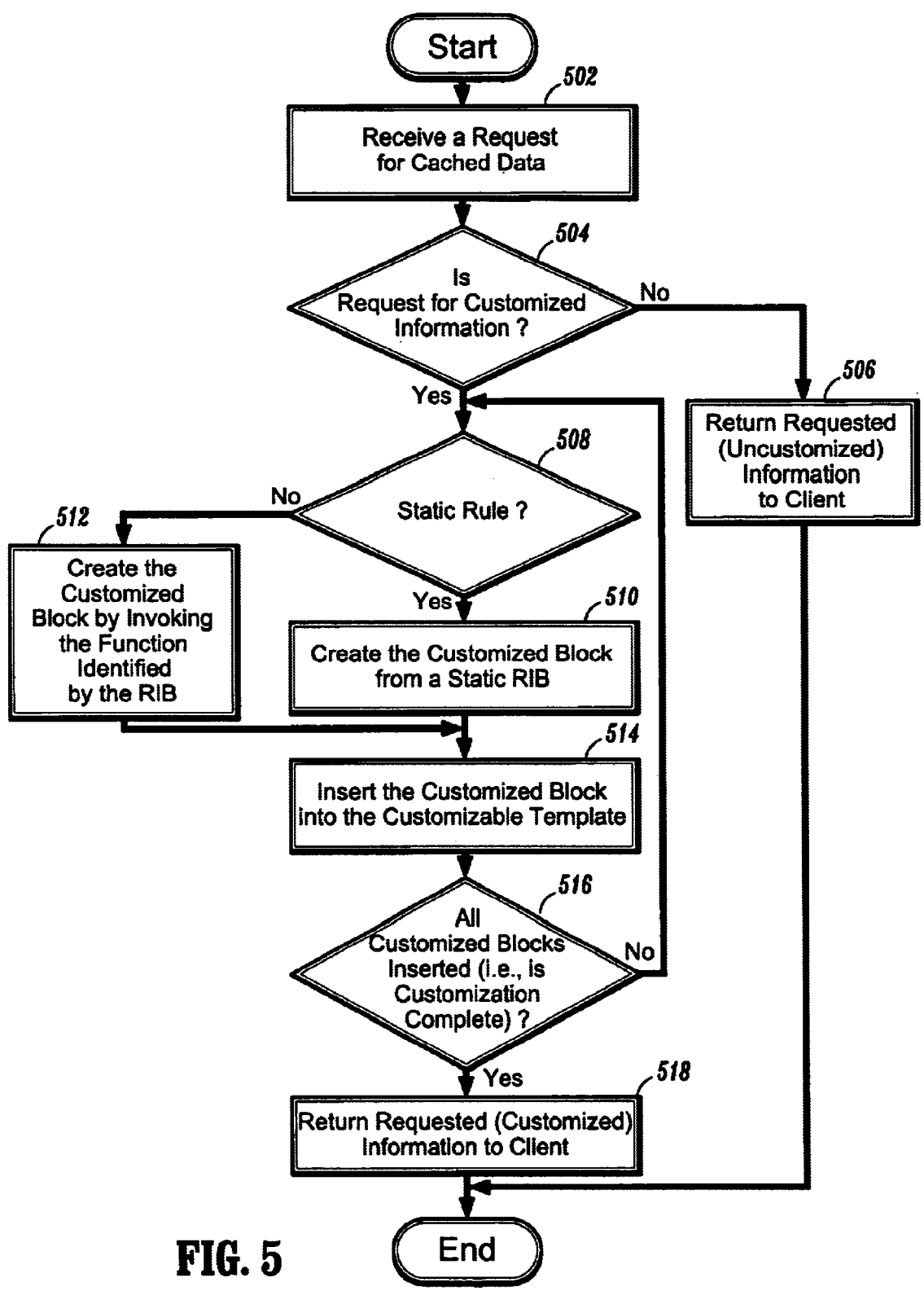
FIG. 5 is a flow diagram illustrating a method for creating customized information by a cache, according to an illustrative embodiment of the invention.

FIG. 5 is a flow diagram illustrating a method for creating customized information by a cache, according to an illustrative embodiment of the invention. A request for cached data is received by the cache 106 (step 502). Conventional methods (e.g. lookup in a cache directory) may be used to determine if the request can be satisfied from the cache 106.

It is then determined whether the request is for customized information (step 504). If the request is for an HTML page, then the cache could determine if the page HTML needs to be customized by examining the requested HTML page for a comment line, for example, similar to the comment line shown in FIG. 2. If such a comment line is detected, then the request can be considered to be for customized information. Otherwise, the request can be considered to not be for customized information.

If the request is not for customized information, then the (uncustomized) information is returned to the client 102 (step 506), and the method is terminated. It is to be appreciated that step 506 can be performed using conventional techniques.

In contrast, if the request is for customized information, then the cache processes the rules for inserting CB's into the appropriate CT (steps 508, 510, 512, 514, and 516).

At step 508, it is determined whether the next unprocessed rule is a static rule. This rule can be obtained by examining a comment line similar to the comment line in FIG. 2 to determine the RIB for the rule and the offset o at which the CB is inserted. The RIB indicates whether the rule is static or dynamic.

If the rule is static, then the CB is created from a static RIB (step 510), and the method proceeds to step 514. For example, suppose that the static RIB is of the form shown in FIG. 3. If the client 102 corresponded to a .edu entity, then the cache 106 would use either file1.txt, file2.txt, or file3.txt for the CB. If the client 102 corresponded to a .com entity, then the cache 106 would use either file4.txt, file5.txt, or file6.txt for the CB. If the client 102 corresponded to another type of entity, then the cache 106 would use file7.txt for the CB. The string "filex.txt" might identify cached data. Alternatively, the string might identify a file accessible to the cache 106. As another possibility, the string might identify a URL identifying data which needs to be fetched remotely. Cookie and/or other information from the client may be passed along with the URL to fetch the remote data.

In contrast, if the rule is not static (i.e., the rule is dynamic), then the CB is created by invoking the function identified by the RIB (Step 512), and the method proceeds to step 514. The function corresponds to an executable computer program that creates the CB. The function may be passed by one or more arguments including, but not limited to, the address of the client 102, cookie and/or other information passed by the client 102, the requested URL, or other information (e.g. query strings or substrings) included in the request. These arguments might better enable the function to create the CB. For example, suppose that the CB should contain the name of the person making the request. The name information could be contained in a cookie.

At step 514, the CB is inserted into the CT at the position identified by the offset o. It is then determined whether all of the CB's have been inserted (i.e., is customization complete) (step 516). If so, then the requested (customized) information is returned to the client 102 (step 518), and the method is terminated. Otherwise, the method returns to step 508.

A variation of this invention, which would be readily contemplated by one of ordinary skill in the related art, would be for a template to specify a position for inserting a CB into another entity instead of in the template itself. In this situation, different CB's for the same entity could be specified in different templates. An offset could be stored in a different template from the template referencing the rule for creating the CB.

Another variation which could be readily contemplated by one of ordinary skill in the related art would be to specify at least one offset and/or rule for a CB in an entity other than the CT which is to contain the CB. In fact, a CT does not have to contain any offsets and/or rule references. For example, all offsets and/or rule references might be contained in another entity.

Figure 6:
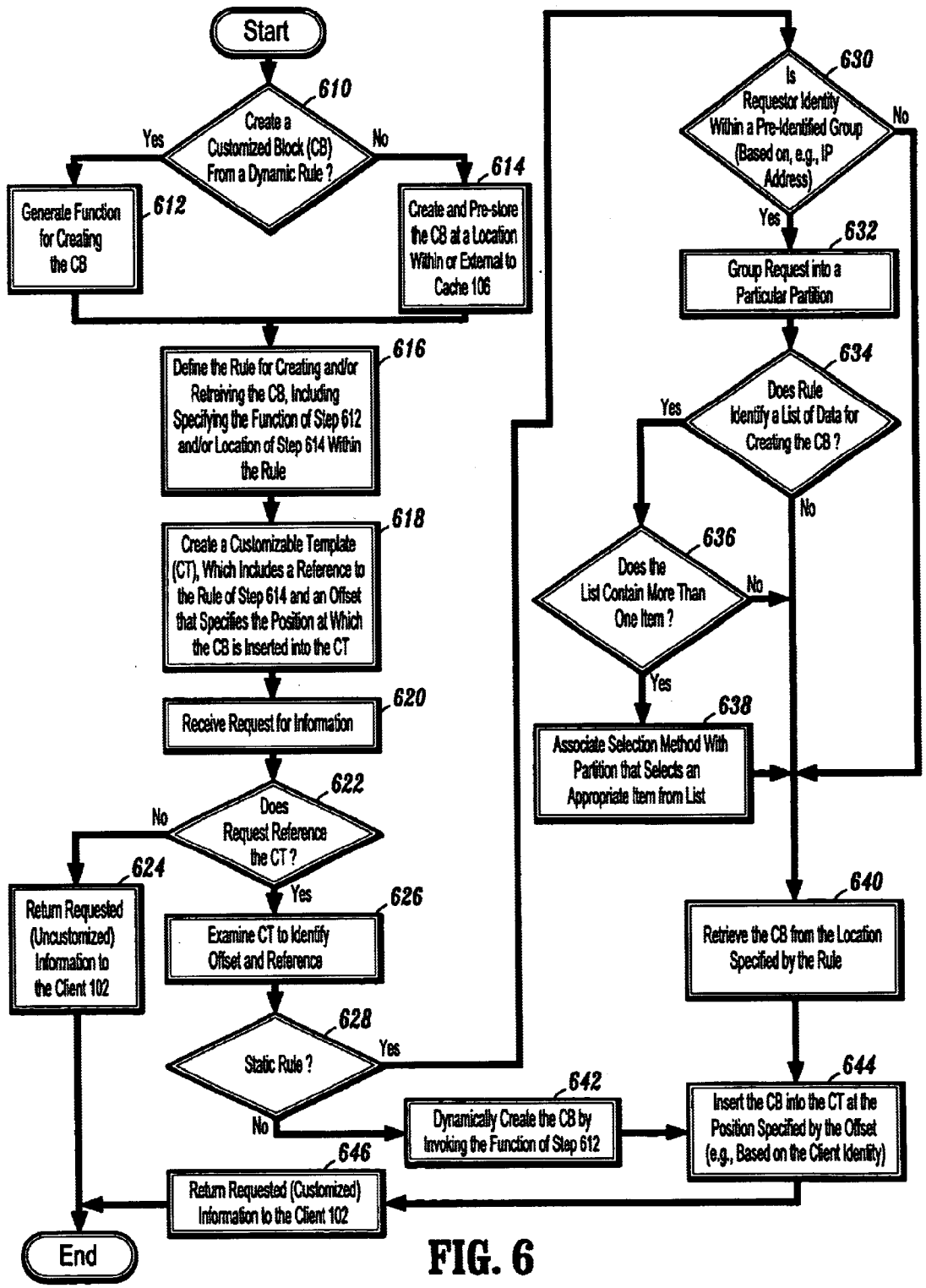
FIG. 6 is a flow diagram illustrating a method for providing customized information in a client-server system, according to an illustrative embodiment of the invention.

FIG. 6 is a flow diagram illustrating a method for providing customized information in a client-server system, according to an illustrative embodiment of the invention. For the sake of simplicity, the method is described with respect to one each of the following: function, rule, offset, customizable template, customized block, and so forth. However, it is to be appreciated that more than one of each of the preceding items may be used. For example, there may be two offsets so that the same block of customized data can be inserted at two places in a document. Alternatively, there may be two offsets so that two different blocks of customized data can be inserted at two different places in the same document. Given the teachings of the invention provided herein, one of ordinary skill in the related art will contemplate these and various other configurations, modifications, and implementations of the elements of the invention.

It is determined whether a customized block of data is to be created from a dynamic rule (step 610). If the customized block is to be created from a dynamic rule, then a function corresponding to an executable computer program is generated for creating the customized block (step 612). If the customized block is not to be created from a dynamic rule (i.e., it is to be created from a static rule, then the customized block is created and pre-stored at a location within the cache 106 or a location external to the cache 106 (e.g., memory device (not shown) of the server 104 or another server) (step 614).

The rule is then defined for creating and/or retrieving the customized block(s) (step 616). Step 616 includes the step of specifying the function for creating the customized block or the location of the customized block (e.g., within or external to the cache 106), depending on whether the rule is dynamic or static, respectively.

A customizable template is created which includes a reference to the rule and an offset that specifies the position at which the customized block is to be inserted into the customizable template (step 618).

Upon receiving a request for information from the client 102 (step 620), it is determined whether the request(s) references the customizable template (step 622). If the request does not reference the customizable template, then the requested (uncustomized) information is returned to the client 102 (step 624), and the method is terminated. However, if the request references the customizable template, then the customizable template is examined to identify the offset and the reference (step 626).

It is determined whether the rule referenced by the reference is static (step 628). If the rule is not static (i.e., it is dynamic), then the method proceeds to step 642. However, if the rule is static, then it is determined whether identity of the requestor is within a pre-identified group (step 630). The determination made at step 630 can be based upon the IP address of the requester.

If the identity of the requester is not within the pre-identified group, then the method proceeds to step 640. However, if the identity of the requester is within the pre-identified group, then the request is grouped into a particular partition (step 632). It is determined whether the rule identifies a list of data for creating the customized block (step 634). If the rule does not identify a list of data, then the method proceeds to step 640. However, if the rule does identify a list of data, then it is determined whether the list comprises more than one item (step 636). If so, a selection method is associated with the partition that selects an appropriate item from the list (step 638). Otherwise, the method proceeds to step 640.

The customized block is then retrieved from the location specified by the rule (step 634), and the method proceeds to step 644.

At step 642, the customized block is dynamically created by invoking the function generated at step 612.

At step 644, the customized block is inserted into the customizable template at the position specified by the offset. The insertion of the customized block at step 644 may be based upon the identity of the client 102. The requested (customized) information is returned to the client 102 (step 646), and the method is terminated.

Although the preferred embodiment of the invention describes customized data in HTML documents, it is to be appreciated that the invention can be used for customizing data in a wide variety of documents, including those written in other markup languages and even non-markup languages. Furthermore, although the preferred embodiment of the invention is described herein with respect to an Internet or Web based client-server environment, it is to be appreciated that the invention is applicable to a wide variety of client-server environments. Given the teachings of the invention provided herein, one of ordinary skill in the related art will contemplate these and various other types of documents and environments to which the invention can be applied.

Although the illustrative embodiments have been described herein with reference to the accompanying drawings, it is to be understood that the present invention and method are not limited to those precise embodiments, and that various other changes and modifications may be affected therein by one of ordinary skill in the related art without departing from the scope or spirit of the invention. All such changes and modifications are intended to be included within the scope of the invention as defined by the appended claims.

What is claimed is:

1. A method for providing customized information in a computer processing system, comprising the steps of:

defining at least one rule for one of creating and retrieving at least one customized block of data;

creating at least one customizable template which includes at least one reference to the at least one rule and at least one offset that specifies at least one position at which the at least one customized block is inserted into the at least one customizable template; and inserting the at least one customized block into the at least one customizable template at the at least one position specified by the at least one offset.

2. The method according to claim 1, further comprising the step of examining the at least one customizable template to identify at least one of the at least one offset and the at least one reference.

3. The method according to claim 1, wherein the computer processing system comprises at least one client, at least one server, and at least one cache.

4. The method according to claim 3, further comprising the steps of:

receiving at least one request for information from the at least one client by the at least one cache; and determining whether the at least one request references the at least one customizable template.

5. The method according to claim 4, further comprising the step of pre-storing the at least one customized block at a location within the at least one cache prior to said receiving step, and wherein said defining step comprises the step of specifying the location of the at least one customized block within the at least one rule.

6. The method according to claim 4, further comprising the step of pre-storing the at least one customized block at a location external to the at least one cache prior to said receiving step, and wherein said defining step comprises the step of specifying the location of the at least one customized block within the at least one rule.

7. The method according to claim 6, wherein the external location is within a memory device of one of the at least one server and a server other than the at least one server.

8. The method according to claim 1, further comprising the step of retrieving the at least one customized block from a location specified by the at least one rule.

9. The method according to claim 4, further comprising the step of dynamically creating the at least one customized block, when the at least one request references the at least one customizable template.

10. The method according to claim 1, further comprising the step of dynamically creating the at least one customized block by invoking a function corresponding to an executable computer program, and wherein said defining step comprises the step of specifying the function within the at least one rule.

11. The method according to claim 3, wherein the at least one customized block is one of created and retrieved based upon the identity of the at least one client.

12. The method according to claim 3, further comprising the step of determining whether to add data to the at least one cache for creating the at least one customized block, based upon an estimated overhead for creating the at least one customized block.

13. The method according to claim 3, further comprising the step of determining whether to delete data from the at least one cache for creating the at least one customized block, based upon an estimated overhead for creating the at least one customized block.

14. The method according to claim 4, wherein the at least one request comprises at least two requests, and said method further comprises the step of partitioning the at least two requests into at least two partitions based upon predefined criteria.

15. The method according to claim 14, wherein the predefined criteria is an identity of an individual initiating the request.

16. The method according to claim 14, wherein the at least one rule identifies a list of data for creating the at least one customized block, and said method comprises the steps of:
   determining whether the list comprises more than one item; and
   associating a selection method with at least one of the at least two partitions that selects at least one appropriate item from the list, when the list comprises more than one item.

17. The method according to claim 4, further comprising the step of populating the at least one cache with at least one of the at least one customized block and the at least one rule, at least one of on demand and automatically though an interface operatively coupled to a server program.

18. The method according to claim 17, further comprising the step of at least one of dynamically updating and changing the at least one rule through the interface.

19. The method according to claim 1, wherein said method is implemented by a program storage device readable by machine, tangibly embodying a program of instructions executable by the machine to perform said method steps.

20. A system for providing customized information in a client-server environment, comprising:
   at least one client;
   at least one server;
   a network adapted to couple the at least one client to the at least one server;
   at least one cache adapted to create the customized information by inserting at least one customized block into at least one customizable template when at least one request for information references the at least one customizable template;
   first interface adapted to couple the at least one server to the at least one cache;
   wherein the at least one customizable template comprises at least one reference to at least one rule and at least one offset that specifies a position at which the customized block is inserted into the at least one customizable template.

21. The system according to claim 20, wherein the at least one rule being adapted to one of create and retrieve.

22. The system according to claim 21, wherein the at least one cache is further adapted to store the at least one rule.

23. The system according to claim 20, wherein the at least one cache is further adapted to store the at least one customized block.

24. The system according to claim 20, wherein the at least one cache is further adapted to store executable functions for creating the at least one customized block.

25. The system according to claim 20, wherein the at least one cache is further adapted to store the at least one customizable template.

26. The system according to claim 21, wherein the at least one cache is further adapted to pre-store the at least one customized block at a location therein, and the at least one rule specifies the location of the at least one customized block.

27. The system according to claim 21, further comprising a memory device external to the at least one cache and adapted to pre-store the at least one customized block therein, and wherein the at least one rule specifies a location of the at least one customized block within said memory device.

28. The system according to claim 21, wherein the at least one cache is further adapted to retrieve the at least one customized block from a location specified by the at least one rule.

29. The system according to claim 20, wherein the at least one customized block is dynamically created, upon the at least one cache receiving the at least one request.

30. The system according to claim 21, wherein the at least one customized block is dynamically created upon an invocation of a function corresponding to an executable computer program, the function being specified by the at least one rule.

31. The system according to claim 20, further comprising means for determining whether to add data to the at least one cache for creating the at least one customized block based on an estimated overhead for creating the at least one customized block.

32. The system according to claim 20, further comprising means for determining whether to delete data from the at least one cache for creating the at least one customized block based on an estimated overhead for creating the at least one customized block.

33. The system according to claim 20, wherein the at least one request comprises at least two requests, and the at least one rule partitions the at least two requests into at least two partitions based upon predefined criteria.

34. The system according to claim 33, wherein the predefined criteria is an identity of an individual initiating the request.

35. The system according to claim 33, wherein the at least one rule identifies a list of data for creating the at least one customized block, and said system further comprises:
   means for determining whether the list comprises more than one item; and
   means for associating a selection method with at least one of the at least two partitions when the list comprises more than one item, the selection method being adapted to select at least one appropriate item from the list.

36. The system according to claim 21, further comprising:
   a second interface adapted to couple the at least one cache to a server program stored in a server other than the at least one server; and
   means for populating the at least one cache with at least one of the at least one customized block and the at least one rule, at least one of on demand and automatically though the second interface.

37. The system according to claim 36, further comprising means for dynamically updating and changing the at least one rule through the second interface.

38. A method for providing customized information in a computer processing system, comprising the steps of:
- defining at least one rule for one of creating and retrieving at least one customized block of data;
- using the at least one rule to one of create and retrieve the at least one customized block of data; and
- inserting the at least one customized block of data into at least one customizable template at at least one specified position;
- wherein the at least one customizable template comprises at least one reference to at least one rule and at least one offset that specifies a position at which the customized block is inserted into the at least one customizable template.

39. The method according to claim 38, wherein said method is implemented by a program storage device readable by machine, tangibly embodying a program of instructions executable by the machine to perform said method steps.

* * * * *